United States Patent
Cooper

(10) Patent No.: US 9,386,192 B2
(45) Date of Patent: Jul. 5, 2016

(54) AV TIMING MEASUREMENT AND CORRECTION FOR DIGITAL TELEVISION

(71) Applicant: James Carl Cooper, Incline Village, NV (US)

(72) Inventor: James Carl Cooper, Incline Village, NV (US)

(73) Assignee: Cascades AV LLC, Chicago, IL (US)

( * ) Notice: Subject to any disclaimer, the term of this patent is extended or adjusted under 35 U.S.C. 154(b) by 0 days.

(21) Appl. No.: 14/522,494

(22) Filed: Oct. 23, 2014

(65) Prior Publication Data

US 2015/0042880 A1    Feb. 12, 2015

Related U.S. Application Data

(62) Division of application No. 14/170,786, filed on Feb. 3, 2014, now Pat. No. 9,071,723, which is a division of application No. 13/347,633, filed on Jan. 10, 2012, now Pat. No. 8,810,659, which is a division of (Continued)

(51) Int. Cl.
| | |
|---|---|
| *H04N 5/067* | (2006.01) |
| *H04N 5/073* | (2006.01) |
| *H04N 5/06* | (2006.01) |
| *H04S 5/00* | (2006.01) |

(52) U.S. Cl.
CPC ............... *H04N 5/067* (2013.01); *H04N 5/06* (2013.01); *H04N 5/073* (2013.01); *H04S 5/005* (2013.01)

(58) Field of Classification Search
CPC . H04N 21/2368; H04N 21/4341; H04N 5/04; H04N 5/073; H04N 5/0733
USPC .......................................................... 348/515
See application file for complete search history.

(56) References Cited

U.S. PATENT DOCUMENTS

| | | |
|---|---|---|
| 2,820,091 A | 1/1952 | Parker et al. |
| 3,525,808 A | 8/1970 | Brown |
| 3,763,317 A | 10/1973 | Coleman, Jr. et al. |

(Continued)

FOREIGN PATENT DOCUMENTS

| | | |
|---|---|---|
| EP | 0012497 A2 | 6/1980 |
| EP | 0430211 A2 | 6/1991 |

(Continued)

OTHER PUBLICATIONS

Cooper, Video to Audio Synchrony Monitoring and Correction, SMPTE Journal, Sep. 1998.

(Continued)

*Primary Examiner* — Michael Lee

(57) ABSTRACT

An invention for measuring, maintaining and correcting synchronization between signals which suffer varying relative delays during transmission and/or storage is shown. The present invention teaches measuring the relative delay between a plurality of signals which have suffered differing delays due to transmission, storage or other processing. The preferred embodiment of the invention includes the use of a marker which is generated in response to a second signal and combined with a first signal in a manner which ensures that the marker will not be lost in the expected processing of the first signal. Subsequently a first delayed marker is generated in response to the marker associated with or recovered from the first signal, and a second delayed marker is generated from the second signal. The first delayed marker and second delayed marker are compared to determine a measure of the relative timing or delay between said first signal and said second signal at said subsequent time.

29 Claims, 2 Drawing Sheets

Related U.S. Application Data application No. 12/471,127, filed on May 22, 2009, now Pat. No. 8,159,610, which is a division of application No. 10/894,746, filed on Jul. 19, 2004, now Pat. No. 7,710,499, which is a division of application No. 09/545,529, filed on Apr. 7, 2000, now Pat. No. 6,836,295.

(56) References Cited

U.S. PATENT DOCUMENTS

| | | |
|---|---|---|
| 3,795,763 A | 3/1974 | Golding et al. |
| 3,835,253 A | 9/1974 | Bond |
| 3,860,952 A | 1/1975 | Tallent et al. |
| 3,906,397 A | 9/1975 | Gruber |
| 3,962,634 A | 6/1976 | Russo |
| 4,005,476 A | 1/1977 | Dickopp et al. |
| 4,018,990 A | 4/1977 | Long et al. |
| 4,063,284 A | 12/1977 | Tatami |
| 4,099,205 A | 7/1978 | Hattori et al. |
| 4,101,926 A | 7/1978 | Dischert et al. |
| 4,110,785 A | 8/1978 | Dischert et al. |
| 4,134,131 A | 1/1979 | Hopkins, Jr. |
| 4,148,070 A | 4/1979 | Taylor |
| 4,178,607 A | 12/1979 | Mikado |
| 4,206,476 A | 6/1980 | Hashimoto |
| 4,212,027 A | 7/1980 | Lemoine |
| 4,214,232 A | 7/1980 | Shaw et al. |
| 4,214,233 A | 7/1980 | Shaw et al. |
| 4,214,262 A | 7/1980 | Mizukami |
| 4,218,675 A | 8/1980 | Shaw et al. |
| 4,218,705 A | 8/1980 | Inaba et al. |
| 4,218,710 A | 8/1980 | Kashigi et al. |
| 4,313,135 A | 1/1982 | Cooper |
| 4,333,108 A | 6/1982 | Quan et al. |
| 4,360,827 A | 11/1982 | Braun |
| 4,361,852 A | 11/1982 | Katzfey |
| 4,389,678 A | 6/1983 | Mizukami et al. |
| 4,439,786 A | 3/1984 | Claydon et al. |
| 4,443,821 A | 4/1984 | Kato |
| 4,468,698 A | 8/1984 | Kavoussi et al. |
| 4,517,587 A | 5/1985 | Aizawa et al. |
| 4,531,149 A | 7/1985 | Lewis, Jr. |
| 4,538,176 A | 8/1985 | Nakajima et al. |
| 4,599,650 A | 7/1986 | Wilkinson |
| 4,611,239 A | 9/1986 | Shanley, II |
| 4,618,890 A | 10/1986 | Kouyama et al. |
| 4,635,097 A | 1/1987 | Tatami |
| 4,644,400 A | 2/1987 | Kouyama et al. |
| 4,654,587 A | 3/1987 | Murphy |
| 4,665,431 A | 5/1987 | Cooper |
| 4,673,980 A | 6/1987 | Murakami et al. |
| 4,675,724 A | 6/1987 | Wagner |
| 4,679,085 A | 7/1987 | Johnson et al. |
| 4,680,621 A | 7/1987 | Baker et al. |
| 4,688,081 A | 8/1987 | Furuhata et al. |
| 4,689,664 A | 8/1987 | Moring et al. |
| 4,689,676 A | 8/1987 | Nakajima et al. |
| 4,698,678 A | 10/1987 | Collins |
| 4,703,355 A | 10/1987 | Cooper |
| 4,733,312 A | 3/1988 | Morimoto |
| 4,750,034 A | 6/1988 | Lem |
| 4,751,588 A | 6/1988 | Tsujimura |
| 4,769,692 A | 9/1988 | McFetridge |
| 4,772,950 A | 9/1988 | Furuhata et al. |
| 4,797,743 A | 1/1989 | Miyazaki |
| 4,802,025 A | 1/1989 | Shinada |
| 4,851,909 A | 7/1989 | Noske et al. |
| 4,963,967 A | 10/1990 | Orland et al. |
| 4,963,977 A | 10/1990 | Jackson et al. |
| RE33,535 E | 2/1991 | Cooper |
| 4,994,914 A | 2/1991 | Wiseman et al. |
| 5,043,811 A | 8/1991 | Yasuhiro |
| 5,045,940 A | 9/1991 | Peters et al. |
| 5,060,077 A | 10/1991 | Koya et al. |
| 5,065,251 A | 11/1991 | Shuhart, Jr. et al. |
| 5,083,201 A | 1/1992 | Ohba |
| 5,164,839 A | 11/1992 | Lang |
| 5,170,252 A | 12/1992 | Gear et al. |
| 5,189,516 A | 2/1993 | Angell et al. |
| 5,189,565 A | 2/1993 | Sato |
| 5,202,761 A | 4/1993 | Cooper |
| 5,204,787 A | 4/1993 | Suzuki et al. |
| 5,233,418 A | 8/1993 | Gumm et al. |
| 5,237,416 A | 8/1993 | Ito et al. |
| 5,243,424 A | 9/1993 | Emmett |
| 5,262,865 A | 11/1993 | Herz |
| 5,282,035 A | 1/1994 | Kakegawa |
| 5,287,185 A | 2/1994 | Cho et al. |
| 5,367,341 A | 11/1994 | Schnorf |
| 5,387,943 A | 2/1995 | Silver |
| 5,397,992 A | 3/1995 | Hill |
| 5,399,976 A | 3/1995 | Wardle |
| 5,420,725 A | 5/1995 | Hsu et al. |
| 5,420,801 A | 5/1995 | Dockter et al. |
| 5,420,894 A | 5/1995 | Boslough et al. |
| 5,430,485 A | 7/1995 | Lankford et al. |
| 5,450,134 A | 9/1995 | Legate |
| 5,471,576 A | 11/1995 | Yee |
| 5,506,932 A | 4/1996 | Holmes et al. |
| 5,530,483 A | 6/1996 | Cooper |
| 5,550,594 A | 8/1996 | Cooper et al. |
| 5,557,334 A | 9/1996 | Legate |
| 5,570,372 A | 10/1996 | Shaffer |
| 5,572,261 A | 11/1996 | Cooper |
| 5,642,171 A | 6/1997 | Baumgartner et al. |
| 5,672,974 A | 9/1997 | Turner |
| 5,675,388 A | 10/1997 | Cooper |
| 5,748,842 A | 5/1998 | Holmes et al. |
| 5,751,368 A | 5/1998 | Cooper |
| 5,818,520 A | 10/1998 | Janko et al. |
| 5,887,117 A | 3/1999 | Desu et al. |
| 6,049,769 A | 4/2000 | Holmes et al. |
| 6,211,919 B1 | 4/2001 | Zink et al. |
| 6,246,439 B1 | 6/2001 | Zink et al. |
| 6,285,767 B1 | 9/2001 | Klayman |
| 6,330,033 B1 | 12/2001 | Cooper |
| 6,351,281 B1 | 2/2002 | Cooper |
| 6,373,960 B1 | 4/2002 | Conover et al. |
| 6,414,960 B1 | 7/2002 | Kuhn et al. |
| 6,480,902 B1 | 11/2002 | Yuang et al. |
| 8,810,659 B2 | 8/2014 | Cooper |

FOREIGN PATENT DOCUMENTS

| | | |
|---|---|---|
| EP | 0868082 A2 | 9/1998 |
| EP | 0868082 A2 | 2/2000 |
| FR | 2651628 A1 | 3/1991 |
| GB | 2243969 A | 11/1991 |
| JP | S5452412 A | 4/1979 |
| JP | 60046683 A | 3/1985 |
| JP | S6046683 A | 3/1985 |
| JP | S60170376 A | 9/1985 |
| JP | S60229589 A | 11/1985 |
| JP | H02305278 A | 12/1990 |
| JP | H0340177 A | 2/1991 |
| JP | 06339129 A | 12/1994 |
| JP | 07038771 A | 2/1995 |
| JP | 07162704 A | 6/1995 |

OTHER PUBLICATIONS

Tektronix, Audio-to-Video Delay Correction Technology Introduction, 2000 National Association of Broadcasters Convention, Apr. 10-14, 2000.

U.S. Pat. No. 5,847,769, Dec. 1998, Cooper (withdrawn).

ITU-R BT.1359-1, "Relative Timing of Sound and Vision for Broadcasting" International Telecommunications Union, Geneva, 1998.

Hoffner, Is Good Lip-Sync Possible With DTV, TV Technology, Dec. 15, 1999, p. 20.

US 5,847,769, 8/1998, Cooper (withdrawn).

(56) References Cited

OTHER PUBLICATIONS

Tektronix, Inc., Case Study entitled "Monitoring Audio-to-Video Delay Errors in a Digital Television Distribution Network", Dec. 2002.
J. Carl Cooper, "Viewer Stress from Audio/Visual Sync Problems," SMPTW Journal, vol. 97, No. 2, pp. 140-142, Feb. 1988.
J. Carl Cooper, "Video-to-Audio Synchrony Monitoring and Correction," SMPTE Journal, vol. 97, No. 9, pp. 695-698, Sep. 1988.
Thomas D.C. Little and Arif Ghafoor, "Synchronization and Storage Models for Multimedia Objects," IEEE Journal on Selected Areas in Communications, vol. 8, No. 3, pp. 413-427, Apr. 1990.
Cosmos Nicolaou, "An Architecture for Real-Time Multimedia Communications Systems," IEEE Journal on Selected Areas in Communications, vol. 8, No. 3, pp. 391-400, Apr. 1990.
Tektronix, Inc., Press Release entitled "Tektronix Announces Automated+ Real-Time Solution for Correction of Audio-to-Video Delay Errors," available at: http://www.tek.com/document/newsrelease/tektronix-announces-automated-real-timesolution-correction-audio-video-delay—(last accessed Sep. 23, 2014), Apr. 10, 2000.
Eugene Zuch, "Put video a/d converters to work," Electronic Design, vol. 26, No. 16, pp. 68-73, Aug. 2, 1978.
Machine translation of JP07038771A (provided by examiner in related U.S. Appl. No. 14/170,786).
Machine translation of JP06339129A (provided by examiner in related U.S. Appl. No. 14/170,786).

AV TIMING MEASUREMENT AND CORRECTION FOR DIGITAL TELEVISION

This application is a Division of application Ser. No. 14/170,786 filed Feb. 3, 2014 and issued as U.S. Pat. No. 9,071,723 on Jun. 30, 2012, which is a Division of application Ser. No. 13/347,633 filed Jan. 10, 2012 and issued as U.S. Pat. No. 8,810,659 on Aug. 19, 2014, which is a Division of application Ser. No. 12/471,127 filed May 22, 2009 and issued as U.S. Pat. No. 8,159,610 on Apr. 17, 2012, which is a Division of Ser. No. 10/894,746 filed Jul. 19, 2004 and issued as U.S. Pat. No. 7,710,499 on May 4, 2010 which is a Division of application Ser. No. 09/545,529 filed Apr. 7, 2000 and issued as U.S. Pat. No. 6,836,295 on Dec. 28, 2004 all of which are incorporated herein by reference as fully as if they had been set out in detail and to which priority is claimed. Application Ser. No. 09/545,529 is in turn a Continuation-in-part of application Ser. No. 09/119,524 filed Jul. 21, 1998 and issued as U.S. Pat. No. 6,351,281 on Feb. 26, 2002 which is a Division of application Ser. No. 08/620,126 filed Mar. 21, 1996 which issued as U.S. Pat. No. 6,330,033 on Dec. 11, 2001 which claims benefit of Provisional Application 60/008,309 filed Dec. 7, 1995. No priority to application Ser. No. 09/119,524, U.S. Pat. No. 6,351,281, application Ser. No. 08/620,126, U.S. Pat. No. 6,330,033 or Application 60/008,309 is claimed, but which are incorporated herein by reference, in respect to their prior art teachings.

The examiner's attention is called to incorrectly published U.S. Pat. No. 5,847,769 which is related to the present application by virtue of common application Ser. No. 08/620,126. The '769 patent was withdrawn from issue. Despite the fact of the patent being withdrawn from issue it was nevertheless published by the Patent Office. Applicant brings this withdrawn patent to the attention of the examiner out of applicant's duty of candor.

BACKGROUND OF THE INVENTION

The invention relates to measuring, maintaining and correcting synchronization between two signals which suffer varying relative delays during transmission and/or storage, and in particular to measuring the relative delay between multiple audio signals and an associated video signal of a television type program which is compressed via MPEG or other compression method for transmission and/or storage.

1. Field of the Invention

The present invention relates to the field of transmitting and storing multiple electronic signals where synchronization of the signals is of concern. When such transmitting and storing are of a nature which makes the corresponding receiving and recovering of said signals subject to timing errors resulting from differing amounts of processing delays the present invention is useful in measuring the relative timing errors or delays between signals with such delay measurement being used as a meter of quality of the transmitting and storing and for maintaining or correction of relative delays between such signals.

2. Description of Related Prior Art

It is known in the television signal transmission field to measure and correct audio to video timing errors by measuring the delay which a video signal experiences and using that measurement to delay a companion audio signal by a corresponding amount.

U.S. Pat. No. 4,313,135 by the present inventor shows to compare relatively undelayed and delayed versions of the same video signal to provide a delay signal responsive to the delay thereof and to couple that delay signal to a variable audio delay to cause the audio delay to delay the companion audio signal by a corresponding amount.

U.S. Pat. Nos. 4,665,431 and 5,675,388 by the present inventor show transmitting an audio signal as part of a video signal so that both the audio and video signals experience the same transmission delays thus maintaining the relative synchronization therebetween.

U.S. Reissue Pat. No. RE 33,535 corresponding to U.S. Pat. No. 4,703,355 shows in the preferred embodiment to encode in the vertical interval of a video signal, a timing signal derived from an audio signal and transmitting the combined video signal and the audio signal. At the receiving location the timing signal is recovered from the video signal and a new timing signal is generated from the received audio signal. The two timing signals are compared at the receiving location to determine the relative delay between the timing signal recovered from the video and the newly generated timing signal, thus determining the relative delay between the video and audio signals at the receive location. It is also suggested to put a timing signal in the audio signal.

U.S. Pat. No. 5,202,761 by the present inventor shows in the preferred embodiment to encode a pulse in the vertical interval of a video signal before the video signal is delayed. The encoded pulse is recovered from the vertical interval of the delayed video signal. Various methods responsive to the encoded pulse or the timing thereof for the undelayed video and the encoded pulse recovered from the vertical interval of the delayed video are shown which enable the determination of the delay, or the control of a corresponding audio delay.

U.S. Pat. No. 5,530,483 by the present inventor shows determining video delay by sampling an image of the undelayed video and sampling images, including the same image of the delayed version of the video and comparing the samples of the undelayed image to the samples of the delayed images until a match is found indicating that the undelayed image in delayed form is being compared. The time lapse between the sampling of the undelayed image, and the finding of the matching delayed image is used as a measure of video signal delay.

U.S. Pat. No. 5,572,261 by the present inventor shows a method of determining the relative delay between an audio and a video signal by inspecting the video for a speaker's mouth and determining various mouth patterns of movement which correspond to sounds which are present in the audio signal. The time relationship between a mouth pattern which creates a sound and the occurrence of that sound in the audio is used as a measure of audio to video timing.

U.S. Pat. No. 5,751,368, a CIP of U.S. Pat. No. 5,530,483 shows the use of comparing samples of relatively delayed and undelayed versions of video signal images for determining the delay of multiple signals.

Applicant incorporates all of the above prior art patents herein as fully as if they were set forth in their entirety for the purposes of enabling one of ordinary skill in the art to practice the present invention in so far as the present invention utilizes many elements which are taught therein. In particular, attention is called to U.S. Pat. No. RE 33,535 and the teachings of generating a timing signal in response to an audio signal, and the comparison of a recovered timing signal and a newly generated timing signal at the receiving site to determine the relative delay therebetween.

The above cited inventions often prove to be less than complete solutions for modern television systems and others which transmit or store a plurality of signals for various reasons including for example those problems recited below. In particular, the current transmission of MPEG compressed television signals has proven to have particular difficulty in maintaining audio to video synchronization, and the prior art has particular problems in dealing with such.

U.S. Pat. No. 4,313,135 compares relatively undelayed and delayed versions of the same video signal to provide a delay signal. This method requires connection between the undelayed site and the delayed site and is unsuitable for environments where the two sites are some distance apart. For example where television programs are sent from the network in New York to the affiliate station in Los Angeles such system is impractical because it would require the undelayed video to be sent to the delayed video site in Los Angeles without appreciable delay, somewhat of an oxymoron when the problem is that the transmission itself creates the delay which is part of the problem. A problem also occurs with large time delays such as occur with storage such as by recording since by definition the video is to be stored and the undelayed version is not available upon the subsequent playback or recall of the stored video.

U.S. Pat. Nos. 4,665,431 and 5,675,388 show transmitting an audio signal as part of a video signal so that both the audio and video signals experience the same transmission delays thus maintaining the relative synchronization therebetween. This method is expensive for multiple audio signals, and the digital version has proven difficult to implement when used in conjunction with video compression such as MPEG.

U.S. Reissue Pat. No. RE 33,535 corresponding to U.S. Pat. No. 4,703,355 shows in the preferred embodiment to encode a timing signal in the vertical interval of a video signal and transmitting the video signal with the timing signal. Unfortunately many systems strip out and fail to transmit the entire vertical interval of the video signal thus causing the timing signal to be lost. It is suggested to put a timing signal in the audio signal, which is continuous thus reducing the probability of losing the timing signal. Unfortunately it is difficult and expensive to put a timing signal in the audio signal in a manner which ensures that it will be carried with the audio signal, is easy to detect, and is inaudible to the most discerning listener.

U.S. Pat. No. 5,202,761 shows to encode a pulse in the vertical interval of a video signal before the video signal is delayed. This method also suffers when the vertical interval is lost.

U.S. Pat. No. 5,530,483 shows determining video delay by a method which includes sampling an image of the undelayed video. This method also requires the undelayed video, or at least the samples of the undelayed video, be available at the receiving location without significant delay. Like the '135 patent above this method is unsuitable for long distance transmission or time delays resulting from storage.

U.S. Pat. No. 5,572,261 shows a method of determining the relative delay between an audio and a video signal by inspecting the video for particular sound generating events such as a particular movement of a speaker's mouth and determining various mouth patterns of movement which correspond to sounds which are present in the audio signal. The time relationship between a video event such as mouth pattern which creates a sound and the occurrence of that sound in the audio is used as a measure of audio to video timing. This method requires a significant amount of audio and video signal processing to operate.

U.S. Pat. No. 5,751,368, a CIP of U.S. Pat. No. 5,530,483 shows the use of comparing samples of relatively delayed and undelayed versions of video signal images for determining the delay of multiple signals. Like the '483 patent the '368 patent needs for the undelayed video or at least samples thereof to be present at the receiving location.

U.S. Pat. No. 6,330,033 and Division U.S. Pat. No. 6,351,281 show a delay tracker for a signal processing system, where the delay tracker utilizes a special code or pulse associated with the tracked signal with the system including a pulse detector later recognizing the special code or pulse in order to identify such signal and ascertain any delays associated with the signal including possible resynchronization of associated signals. In the preferred embodiment the invention is utilized with video and audio signals to measure or maintain lip sync. The delay tracker is associated with the video signal in a manner that it will be carried through the processing that it is expected to receive. In one particular example the tracker which is associated with the video signal is generated in response to certain artifacts or characteristics already present in the audio signal.

The instant invention provides for improvements in the field of transmitting and storing multiple electronic signals where synchronization of the signals is of concern, for example related to U.S. Pat. Nos. 6,330,033 and 6,351,281.

Attempts have been made to add various timing related signals in television program streams in order to maintain audio to video synchronization. In particular in MPEG systems control signals such as time stamps are utilized. Unfortunately the inclusion of these signals does not guarantee proper audio to video synchronization at the receive side output of the system for a variety of reasons, including the fact that there are significant video delays which occur which cannot be tracked by the time stamps.

BRIEF SUMMARY OF THE INVENTION

It is an object of the invention to provide a method for measuring or maintaining the relative delay of a plurality of signals which are passed through subsequent processing.

It is another object of the invention to provide a method of generating a marker in response to a second signal which marker may be associated with a first signal in a fashion that said marker is carried with said first signal through processing of said first signal.

It is still another object of the invention to provide a method of responding to a marker which has been associated with a first signal and a marker which is provided in response to a second signal whereby said markers may be utilized to determine the relative delay between said first and second signals.

It is a further object of the invention to provide a marker in response to a signal wherein said marker indicates the occurrence of particular characteristics of said signal.

It is a still further object of the invention to provide a system of measuring the relative delay between an audio and a video signal in a television system wherein the audio and video signals are subject to differing processing which creates unequal delays in said signals.

It is yet still a further object of the invention to provide a method of marking a first signal which may be a video signal to allow relative delay measurement of said first signal and a second signal which may be an audio signal after they have been processed, including use of a marker generator responsive to the second signal to generate a marker upon the occurrence of one or more particular characteristics of the audio, associating the marker with the video signal in a fashion such that the marker will be carried with the video signal and not be adversely affected by the subsequent processing thereof.

It is yet still another object of the invention to provide a relative delay measurement system for measuring the relative delay between a plurality of signals including a first signal which is a video signal and second signal which is an audio signal which signals experience unequal delays due to processing thereof, the invention including use of a marker generator responsive to the audio signal to generate a marker upon the occurrence of one or more particular characteristics of the audio, associating the marker with the video signal in a fashion such that the marker will be carried with the video signal but not be adversely affected by the subsequent processing thereof, responding to the marker with the video signal after the processing to generate a first delayed marker; generating a second delayed marker in response to the processed audio signal, comparing the relative timing of the first and second delayed markers to determine the relative timing between the processed audio and processed video signal.

The preferred embodiment of the invention may be used with a television signal. At the transmitting location a marker is generated in response to the audio signal and is associated with the video signal such that the marker is carried with the video signal in a fashion such that it will not be lost or adversely affected by the expected processing of the video signal. The audio signal and the marker associated video signal are stored, transmitted and/or processed and made available at a later time thus becoming delayed video and audio signals. A first delayed marker is recovered from the delayed video signal and a corresponding second delayed marker is generated from the delayed audio signal, with the two delayed markers compared to determine the relative delay therebetween. This relative delay between these markers is responsive to and is a measure of the delay between the delayed video signal and delayed audio signal.

Somewhat simplistically stated, the preferred embodiment of the invention operates by generation of the marker at the transmit section, which may be thought of a marking the video at the time of the occurrence of a known event in the audio signal. The time marker is associated with the video signal such that it is carried in time with the video signal for all of the processing which the video signal is to experience. After the video signal processing and any audio signal processing, the same event in the audio is again marked in time, and the previously marked time (relative to the video) is recovered or flagged in the received video. Since it is known that the audio event and the marking of the video occurred (substantially) simultaneously at the transmit location, the displacement between those events at the receive location is a measure of the audio to video timing error, or the relative delay therebetween.

Generally, the present invention teaches measuring the relative delay between a plurality of signals which have suffered differing delays due to transmission, storage or other processing. The preferred embodiment of the invention includes the use of a marker which is generated in response to a second signal and combined with a first signal in a manner which ensures that the marker will not be lost in the expected processing of the first signal. Subsequently a first delayed marker is generated in response to the marker associated with or recovered from the first signal, and a second delayed marker is generated from the second signal. The first delayed marker and second delayed marker are compared to determine a measure of the relative timing or delay between said first signal and said second signal at said subsequent time.

DETAILED DESCRIPTION OF THE INVENTION

Figure 1:
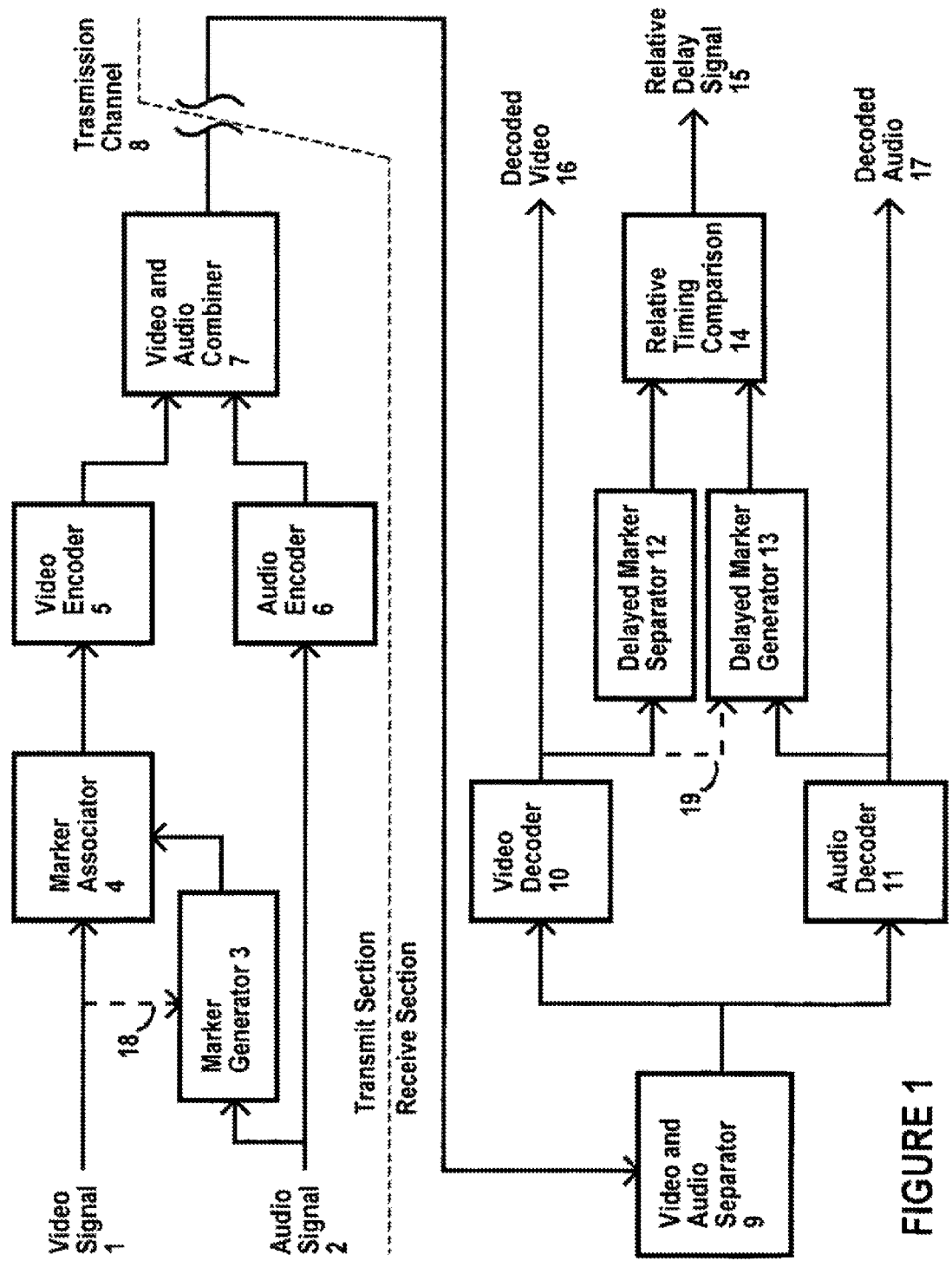
FIG. 1 shows a block diagram of the preferred embodiment of the invention as used with a television audio and video signal.

In FIG. 1 the preferred embodiment of the invention which is given by way of example, a video signal 1 and an audio signal 2 are present at what will be referred to as the transmit location. Either or both the video and audio signals may be in analog or digital, compressed or uncompressed form, the many variations and versions of which are well known in the art. Further. while the preferred embodiment is shown in respect to one video and one audio signal, it will be appreciated from the teachings herein that the invention may be utilized and practiced with multiple video and/or audio signals. In particular, by way of example the invention may be practiced with video and stereo (2 channel), surround (4+channel) or 5.1 channel audio systems as are contemplated for the new U.S. digital and HDTV transmission standards. It is also noted that the components of the invention may be implemented by analog, digital or software means or combinations thereof.

A marker generator 3 is responsive to the audio signal, and may be responsive to the video signal as indicated by the dashed line. In response to detecting the occurrence of one or more particular feature or characteristic of the audio signal generates a marker. One of ordinary skill in the art will recognize that element 44 of U.S. Pat. No. RE 33,535 may be utilized as element 3 herein. Other constructions and operations of 3 will also be known to one of ordinary skill from the present teachings. The particular features, characteristics, occurrences or other event in the audio signal which will result in the marker, will be referred to hereinafter as occurrences and the marker in its various forms will sometimes be referred to simply as a marker, one of ordinary skill understanding from the context and the teachings herein the specificity of the form or forms being referred to.

The marker from 3 is associated with the video signal 1 in a marker associator 4. One of ordinary skill in the art will recognize that element 10 of the U.S. Pat. No. 6,330,033 specification can be used for element 4 herein. Other constructions and operations of 4 will also be known to one of ordinary skill from the present teachings. The marker is preferred to be associated with the video signal in a fashion that the marker will not be lost, corrupted or modified beyond use by subsequent processing of the video signal. In particular it is preferred to associate the marker with the video signal by including the marker within the active picture information of the video signal in one of the manners disclosed in detail in the U.S. Pat. No. 6,330,033 specification. Consequently the marker may take on a form of active video, whatever form the video may be in.

Alternatively, the marker may be associated with the video signal by being encoded in the active video in a relatively invisible fashion by utilizing one of the various watermark techniques which are well known in the art. Watermarking is well known as a method of encoding the ownership or source of images in the image itself in an invisible, yet recoverable fashion. In particular known watermarking techniques allow the watermark to be recovered after the image has suffered severe processing of many different types. Such watermarking allows reliable and secure recovery of the marker after significant subsequent processing of the active portion of the video signal. By way of example, the marker of the present invention may be added to the watermark, or replace a portion or the entirety of the watermark, or the watermarking technique simply adapted for use with the marker. It is believed that this use of watermarking techniques to associate marker signals with video signals for audio to video timing purposes is novel and previously unknown to those in the art. Other methods of associating the marker with the video signal will be known to those of ordinary skill in the art from the teachings herein.

The video signal with the marker is output from 4 and coupled to the video encoder 5. The video encoder 5 is used by way of example in the present description to represent that part of the subsequent video processing which may take place at the transmitting side of the system. For example, the video encoder may include MPEG preprocessing and compression circuits. Similarly, the audio 2 is coupled to an audio encoder 6 which is used by way of example in the present description to represent the audio processing which may take place at the transmitting side of the system. For example, the audio encoder may include an MPEG compression circuit. The compressed video and audio signals are combined by video and audio combiner 7 and the combined signals are coupled to the transmission channel 8.

The audio and video signals from the transmission channel 8 are coupled to a video and audio separator 9 which separates the audio and video signal components of the transmitted signal(s). The audio and video signals are coupled to audio decoder 11 and video decoder 10 respectively, where they are decoded back into decoded audio 17 and decoded video 16 respectively.

At the receiving side, marker separator 12 responds to the marker which was previously combined in the video signal by 4 to provide a first delayed marker to 14. The first delayed marker may be in the same form or different form as the marker which is associated with the video. It is preferred that the marker be recovered from the video and provided as the first delayed marker, however it is sufficient to merely detect the presence of the marker in the video and generate a first delayed marker in response thereto. One of ordinary skill in the art will recognize that element 40 of the U.S. Pat. No. 6,330,033 specification may be utilized for element 12 herein. Other constructions and operations of 12 will also be known to one of ordinary skill from the present teachings.

Also at the receiving side, another marker generator 13, similar to 3, generates a second delayed marker in response to the same audio signal occurrences in the receive section audio from 11 as did the marker generator 3 on the transmit section in response to audio signal 2. Marker generator 13 may also be responsive to video in a fashion as previously described for 3 as shown by 19. The second delayed marker generated by 13 need not be in the same form as the marker generated by 3, but is preferred to be in the same form as the first delayed marker provided by 12.

The first and second delayed markers from 12 and 13 are coupled to the relative timing comparison 14. The relative timing comparison is responsive to these delayed markers to determine the timing between corresponding pairs thereof to determine the relative timing between them. In other words the relative timing comparison 14 determines the delay 15 of the later of the two delayed markers relative to the earlier, indicating both the magnitude of the delay and which signal is more delayed. One of ordinary skill in the art will recognize from the teachings herein that relative timing comparison 14 may operate as described with respect to element 50 of the U.S. Pat. No. 6,330,033 specification. Other constructions and operations of 14 will also be known to one of ordinary skill from the present teachings.

Since the first delayed marker from 12 experiences the delay of the video signal 1, and the second delayed marker from 13 experiences the delay of the audio signal 2 in their respective paths from the input of the transmit section to the output of the receive section, signal 15 is a measure of the relative delay of audio 17 and video 16 at the output of the receive section.

The relative delay 15 may be utilized for all of the uses and reasons set forth in the U.S. Pat. No. 6,330,033 specification. In particular note that the relative delay signal 15 is useful in itself as a measure of system quality. Relative delay signal 15 may be utilized to control a delay to delay the earlier of 16 or 17 to place the two signals into synchronization. Relative delay signal 15 may also be utilized to control a delay which is incorporated into 10 or 11 or both (or elsewhere in the system) to control the delay of the earlier of the audio or video from 9 to maintain the two signals 16 and 17 in synchronization. Relative delay signal 15 may also be utilized for other purposes, for example as feedback to control the operation of encoder 5 or 6 or decoder 10 or 11 to minimize or otherwise optimize delay or encoding and decoding of audio or video.

Various different embodiments of the invention herein described will be apparent to one of ordinary skill in the art from the teachings herein. As an example, the marker generator 3 may be responsive to the video signal as shown by 18 in order to relate the marker to the video signal, for example to properly locate the marker for combination with the video signal or to relate the particular feature(s) of the audio signal to timing of the video signal. In particular, it is desired that the marker represent whether or not the particular features occurred in the audio signal during the one or more frame or field immediately prior to the marker being combined with the video and going back to the time when the immediately previous marker was combined.

The marker is preferred to be a binary signal which indicates that one or more of a number of particular occurrences of the audio which has taken place during the preceding field(s), or is currently taking place. For example, an 8 bit binary signal may be utilized with different numbers corresponding to different occurrences or features. In the preferred embodiment, it is preferred that the audio signal, which in the present example is assumed to have a bandwidth of 10 Hz to 20,000 Hz be broken up into 8 different frequency bands by bandpass filtering. Each bit of the 8 bit number corresponds to the presence of audio frequencies within a particular band having energy within known levels and for known time durations. For example, if no such frequencies are present, the binary number 0 (0000 0000) results. If the lowest frequencies occur, the binary number 1 (0000 0001) results. If the next highest frequency occurs the binary number 2 (0000 0010) results. If both the lowest and next highest occur a 3 results. If all frequencies occur the binary number 255 (1111 1111) results. The binary number is the marker which is combined with the video.

It is important to note that by associating the marker with the video signal in the fashion of including it in the active video portion of the signal that the marker will not be lost when all of the sync and blanking (or line, field and other ancillary signals if in digital form) are removed from the video signal such as is done as part of the MPEG encoding process. The association of the marker directly with the image carried by the video signal essentially guarantees that no matter what processing, stripping or modification of ancillary portions of the video signal occurs, in either analog or digital form, or conversion of scanning rates, or adjustment of usual video parameters such as black, brightness and chroma, that the marker will still be detectable at the receive location.

The transmission channel 8 is utilized in the present example to represent any common or independent use or processing of the video signal 1 and audio signal 2 which may cause or result in unequal delays which lead to timing difficulties. Examples of such uses include transmission, storage and further processing, and in particular include storage and/or transmitting of MPEG encoded audio and video signals.

Also it may be noted that marker generators 3 and 13 may respond to video in other forms, or from other parts of the system, or may respond to other signals, for example a genlock reference, in order to achieve proper operation and timing of the marker generator.

It may be noted that the use of the video encoder 5, audio encoder 6 and video and audio combiner 7 is given by way of example, as is usual for MPEG compression and transmission systems which are commonly used in today's television systems. The invention is not limited to the use of such elements however and one of ordinary skill in the art will know how to practice the generation of the marker and the associating of the marker with the video signal in other systems from the present teachings. The combined marker and video signal from 4 and the audio signal 2 may very well be utilized in practicing the present invention without the added elements 5-7.

It will be understood that in the present example the elements 9, 10 and 11 are the receiving side elements complimentary to corresponding transmitting side elements 7, 5 and 6 respectively. As with 5, 6 and 7, elements 9, 10 and 11 are not required to practice the invention. In particular, video from 4 may be coupled, via a transmission channel directly to element 12 and become video signal 16. Similarly, audio signal 2 may be coupled via the same or different transmission channel directly to 13 and become audio signal 17.

In the situation where the transmission channel includes storage of the audio and video signals, and storage and recovery is not performed simultaneously, it is noted that a single marker generator 3 may perform the function of 3 upon the storing of the signals and subsequently perform the function of 13 upon the recovery of the stored signals. Other sharing of circuitry between storing and recovery functions may also be had given the assumption that both are not performed simultaneously.

Figure 2:
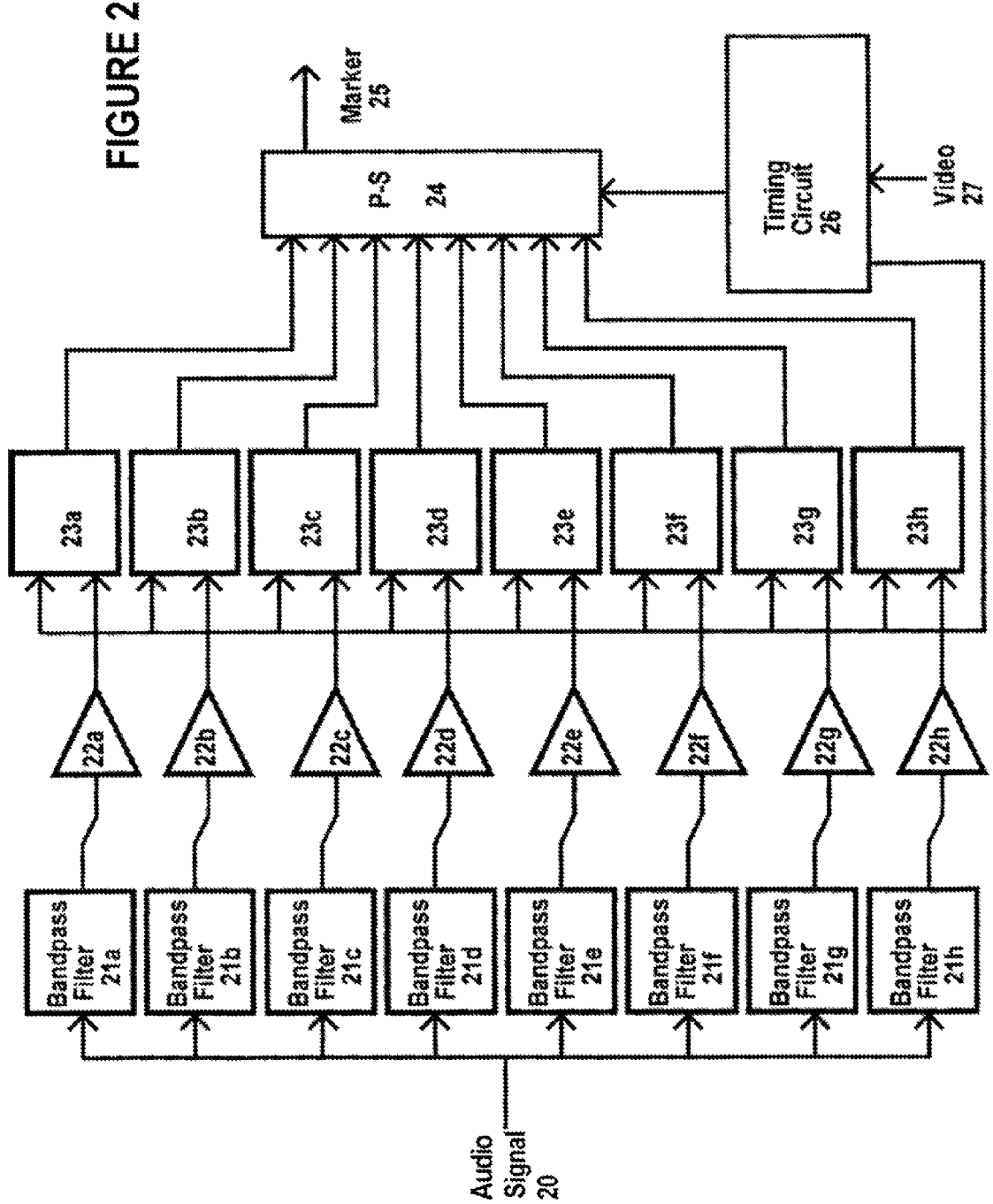
FIG. 2 shows a block diagram of the marker generator 3 and 13 of the preferred embodiment of the invention.

FIG. 2 shows the preferred form of the marker generator 3 and 13 of the preferred embodiment of the invention as used with television audio signals. Audio signal 20 which may correspond to 2 or the output of 11 in FIG. 1 is coupled to a bank of 8 bandpass filters 21a-h which are configured to pass only audio within a range of frequencies as is well known in the art. The output of each bandpass filter is coupled to a comparator 22a-h respectively. The comparators include hysteresis or other threshold(s) and bipolar response characteristic so that if the positive or negative half cycle of bandpassed audio out of the bandpass filter exceeds a threshold amount set by the hysteresis, the output of the comparator is activated. Each comparator output is respectively coupled to a timing duration circuit 23a-h. Each timing duration circuit also receives a reset signal from the timing circuit 26. The timing circuit 26 provides signals to the parallel to serial converter 24 in addition to the reset signal provided to the timing duration circuits 23. Once the timing duration circuit is reset, it inspects the output signal from its respective comparator 22. If the output signal from 22 is activated for an established time duration indicating the presence of audio frequencies within the corresponding bandpass filter range, the timing duration circuit sets its output active and holds it active until the next reset signal. The outputs of all of the timing duration circuits 23 are simultaneously latched into the parallel to serial circuit 24 upon command from the timing circuit 26 and shortly thereafter the reset signal to 23 is generated. Also shortly after latching, the bits latched into 24 are caused to be output in serial fashion as marker 25. The net effect of the circuitry is to set a bit of the timing signal active corresponding to each of the bandpass audio frequencies which was present during the time period from one reset signal to the next, which corresponds to the time period from the generation of one marker to the next. The timing circuit 26 is responsive to the video signal to set the desired time period between markers, as well as to time the output of the marker 25 so that it is associated with the video signal at the correct time. This action will ensure that the marker is placed at the desired position in the video signal.

The bandpass filters are preferred to be selected to provide frequent outputs with the expected types of audio signals. For commercial television audio signals it has been found that bandpass filters with center frequencies of 25, 50, 150, 400, 1000, 2500, 6000, 15000 Hz and skirts of 6 dB per octave work well. Other center frequencies and bandwidths may be chosen, and the number of filters changed, to facilitate expected audio signal frequency content. Ideally the frequencies would be chosen such that the lowest frequency filter has an output which is active or makes a change of state only once per period of the maximum expected delay differential of the audio and video signal. Alternatively, other audio characteristics may be relied on in the place of, or in addition to, the detection of energy at particular frequencies as described in respect to the preferred embodiment. Examples include, but are not limited to, impulse characteristics, amplitude characteristics, relationships between different frequency energies, relationships among and between different audio channels.

Another example of alternate audio characteristics which may be utilized for the marker is the particular audio sonic characteristics which are relied on for the audio compression. Because these characteristics are already detected in the compression circuitry the present invention may share circuitry thus resulting in lowered cost. Other sharing of circuitry with other functions may be possible depending on the particular signals and environment with which the invention is used.

While it has been described to utilize the marker generator with one audio signal in the preferred embodiment, it will be understood that multiple audio signals may be accommodated, with each having a corresponding marker which is associated with the video. Alternatively a plurality of audio signals may be used to generate a lesser number or even one marker by various techniques which include combining the plurality of audio signals before coupling to the marker generator, or by combining various markers each responsive to one or a small number of audio signals with the various markers being combined into a smaller number or a single master marker.

It may be noted that many audio ICs which are used for audio graphic equalizer functions contain bandpass filters which may be adapted to use in this invention. Of course it is possible to implement the various elements of the marker generator, as well as the rest of the invention, in analog or digital hardware, or software/hardware or combinations thereof.

It will be noted that the present description of the preferred embodiment of the invention is given by way of example. In particular the diagrams of the preferred embodiment are presented as block diagrams and do not show in detail circuitry and cooperation which would be known to those of ordinary skill in the art from the teachings herein without undue experimentation. By way of example it is noted that where one signal line is shown in the block diagram that multiple signals may in actuality be coupled between one block and another, and although separate functional blocks are shown it will be known to make different combinations, arrangements and implementations in order to share elements therebetween and reduce costs. It is also noted that various terms used in the specification, including generator, combiner, encoder, separator, decoder and comparison, and their various tenses are intended to have broader meaning than that ordinarily ascribed thereto with respect to circuit elements, and are intended to cover not only the commonly understood element but the equivalent operation or function as implemented by other circuitry or software/hardware combinations. One of ordinary skill in the art will know to resort to various changes and modifications to the invention as described as well the combination of the invention with other features functions and/or inventive concepts in order to accommodate the use of the invention with particular forms of signals and otherwise to practice the invention in a fashion which is optimized for particular application without departing from the spirit and scope of the invention as hereafter claimed.

The invention claimed is:

1. An apparatus for generating a first set of markers in response to a relatively undelayed or delayed plurality of channels audio signal which is part of a high definition television program which first set of markers are intended to be utilized with a second set of markers generated in response to a delayed or undelayed version respectively of the audio signal, said apparatus including:
   a) an input circuit responsive to a digital audio portion of a high definition television program, said input circuit including combining a plurality of channels of said digital audio portion to provide a first digital output signal capable of carrying energy in a range of audio frequencies;
   b) an input filter circuit comprised of at least two digital filters, each responsive to said first digital output signal, each having a different amplitude response characteristic and each operative to provide a digital filter output signal having an amplitude which is responsive to one or more characteristic of said digital output signal;
   c) a marker generator circuit responsive to said digital filter output signals and in response thereto generating a sequential plurality of first markers wherein the sequence of said sequential plurality of first markers is generated in response to the timing of frames of video of said high definition television program.

2. An apparatus as in claim 1 where said digital audio portion of a) is made up of 5.1 channels of digital audio which are all combined to provide said first digital output signal.

3. An apparatus as in claim 1 where said sequential plurality of first markers of element c) are time sequential in response to the time sequence of said frames of video of element c) and said first markers which are generated during the time period from one frame of video to the next frame of video are associated with said next frame of video.

4. An apparatus as in claim 1 wherein said one or more characteristic of said digital audio portion of element b) is one or more of: energy at particular frequencies; impulse characteristics; amplitude characteristics; relationships between different frequency energies; relationships among different audio channels and/or relationships between different audio channels.

5. An apparatus as in claim 1 wherein in element b) said at least two digital filters are each responsive to the amplitude of said first digital output signal of element a) to provide a different respective said digital filter output signal as determined by the respective said different amplitude response characteristic of each said digital filter.

6. An apparatus as in claim 1 wherein in element b) two digital filters are each responsive to the amplitude of said first digital output signal of element a) the two digital filters thereby providing a first filter output signal and a second filter output signal as determined by the respective said different amplitude response characteristic of each said digital filter and wherein in element c) said marker generator circuit is responsive to the amplitude of said first filter output signal and the amplitude of said second filter output signal to generate said sequential plurality of first markers.

7. An apparatus as in claim 1 wherein in element b) a first digital filter of said at least two digital filters is responsive to energy of said digital audio portion and said different amplitude response characteristic to provide a first said digital filter output signal and wherein in element c) said marker generator circuit includes at least one comparator circuit which is responsive to said first said digital filter output in order that said markers are generated in response to the filtered positive and negative half cycles of said digital audio portion exceeding a threshold of said comparator circuit.

8. An apparatus for generating a first set of markers in response to a relatively undelayed audio signal having one or a plurality of channels which is part of a high definition television program which first set of markers are intended to be utilized with a second set of markers generated in response to a delayed version of the audio signal, said apparatus including:
   a) an input circuit responsive to one channel or a combined plurality of channels of the digital audio portion of a high definition television program and providing a first digital output signal capable of carrying the audio energy present over a range of audio frequencies in said channel or said combined channels;
   b) an input filter circuit comprising at least two digital filters, each said digital filter having a different amplitude response characteristic as compared to the other said digital filter(s) with each said digital filter being responsive to said first digital output signal to provide a digital filter output signal having an amplitude which is responsive to one or more characteristic of the positive and negative half cycles of said digital audio portion and the respective said amplitude response characteristic for that filter;
   c) a marker generator circuitry including digital comparator circuitry and responsive to two said digital filter output signals corresponding to said at least two of said digital filters and in response thereto said marker generator circuit generating a sequential plurality of first digital markers wherein said sequence is generated in further response to frames of video of said high definition television program;
   d) with said sequential plurality of first digital markers being associated with said video of said high definition television program such that said plurality of first digital markers will be carried with said video of said high definition television program as it is delayed by further processing and becomes a delayed high definition television program with a delayed audio portion and delayed video portion.

9. The apparatus of claim 8 further including:
   e) an second input circuit the same as a) but responsive to said delayed audio of d) to provide a second digital output signal;
   f) a second input filter circuit the same as b) but responsive to said second digital output signal to provide second digital filter output signals;
   g) a marker generator circuitry the same as c) but responsive to two said second digital filter output signals of f) corresponding to said at least two of said digital filters of f) and generating a sequential plurality of delayed digital markers wherein said sequence is generated in further response to frames of delayed video of said delayed high definition television program;

h) a comparison circuit wherein a first set of markers taken from said sequential plurality of first digital markers of c) is compared with a second set of markers taken from said sequential plurality of delayed digital markers of g) to determine the advance or delay of said delayed audio of d) relative to said delayed video of d).

10. The apparatus of claim 9 wherein said first set of markers is taken from said sequential plurality of first digital markers of d) which have been associated with said delayed video of said delayed high definition television program and are subsequently recovered from their association with said delayed video before their comparison in h).

11. The apparatus of claim 9 wherein said comparison circuit of h) includes a correlator for correlating said first set of markers of h) with said second set of markers of h) to determine the advance or delay of said delayed audio of d) relative to said delayed video of d).

12. The apparatus of claim 10 wherein said comparison circuit includes a correlator for correlating said first set of markers which are subsequently recovered from their association with said delayed video with said second set of delayed markers of f) to determine the advance or delay of said delayed audio of d) relative to said delayed video of d).

13. In a digital system operating with a high definition television program having video and audio portions the audio portion having one or more channels and where a sequential plurality of first markers is associated with the video of the high definition television program before the high definition television program is delayed by further processing to become a delayed high definition television program with delayed audio and delayed video portions, an apparatus for generating delayed markers in response to the delayed audio which delayed markers are intended to be utilized with the first markers which are recovered from their association with the delayed video to determine whether the delayed audio leads or lags the delayed video, said apparatus including:

a) a delayed audio input circuit responsive to positive and negative half cycles of a channel or combined plurality of channels of delayed audio of a delayed high definition television program and in response to said half cycles providing a delayed digital output signal carrying energy of said channel or combined plurality of audio channels over a range of audio frequencies;

b) a delayed input filter circuit comprised of at least two digital filters, each said digital filter having a different response characteristic as compared to the other said digital filter(s) each said digital filter operative to provide a corresponding digital filter output signal having an amplitude which is responsive to the respective said digital filter's response characteristic and to one or more characteristic of said positive and negative half cycles of said delayed audio carried by said delayed digital output signal;

c) a marker generator circuit including a comparator circuit responsive to at least a first said digital filter output signal of b) to provide a comparator output signal and in response to said comparator output signal said marker generator circuit generates a sequential plurality of delayed markers;

d) a comparison circuit wherein said sequential plurality of delayed markers of c) is in the same form as a sequential plurality of first markers which were previously associated with the video of said delayed high definition television program said comparison circuit operating to compare a first set of makers taken from said sequential plurality of delayed markers of c) with a second set of markers taken from said sequential plurality of first markers which have been recovered from their association with the video of said delayed high definition television program.

14. An apparatus as claimed in claim 13 wherein said positive and negative half cycles of said delayed audio of a) have an amplitude and are carried by said delayed digital output signal of a) which delayed digital output signal carrying the positive and negative half cycles are coupled to and filtered by one of said digital filters of b) to provide said first digital filter output signal of c) having an amplitude responsive to said filtered positive and negative half cycles which said digital filter output signal is coupled to said comparator of c) and when the digital filter output signal amplitude exceeds a threshold amount the output of said comparator is activated thereby generating said comparator output signal of c).

15. An apparatus as in claim 13 wherein said sequential plurality of delayed markers of c) are responsive to one or more characteristic of said plurality of channels of delayed audio of element a) which characteristic is one of energy at particular frequencies, impulse characteristics, amplitude characteristics, relationships between different frequency energies, relationships among different audio channels and/or relationships between different audio channels, of said digital audio portion.

16. An apparatus as in claim 13 wherein said sequential plurality of delayed markers of c) are responsive to the relationship between energies of said plurality of channels of delayed audio of element a) being present in different ranges of audio frequencies less than said range of audio frequencies which said plurality of audio channels is capable of carrying of element a).

17. An apparatus as in claim 13 wherein said delayed markers of c) represent a threshold being exceeded by an amount of energy in a range of frequencies less than said range of audio frequencies which said plurality of audio channels of element a) is capable of carrying.

18. An apparatus as claimed in claim 13 wherein said delayed markers of c) are responsive to the amplitude characteristics of said digital filter output signal from each of said at least two digital filters of said input filter circuit.

19. An apparatus as claimed in claim 13 wherein said delayed markers of c) are responsive to the amplitude of each said digital filter output signal from each of said at least two digital filters of said input filter circuit exceeding a corresponding threshold.

20. An apparatus as claimed in claim 13 wherein two of said at least two digital filters of said input filter bank has a corresponding digital filter output signal having an amplitude which is representative of audio energy passed by the respective filter and said digital filter output signal amplitudes from said two digital filters are compared to determine the relationship between different frequency energies of audio with said delayed markers of c) being responsive to said relationship.

21. An apparatus for generating a first set of markers in response to a relatively undelayed or delayed plurality of channels of an audio signal which is part of a high definition television program which first set of markers are intended to be utilized with a second set of markers generated in response to a delayed or undelayed version respectively of the audio signal, said apparatus including:

a) an input circuit responsive to a digital audio portion of a high definition television program, said input circuit including combining a plurality of channels of said digital audio portion to provide at least a first digital output signal capable of carrying energy from both of the half cycles of said combined plurality of channels in a range of audio frequencies;
b) a filter circuit comprised of at least two digital filters,
   i) each digital filter responsive to said first digital output signal,
   ii) each digital filter having a different frequency response characteristic as compared to the other digital filter(s),
   iii) each digital filter operating in response to its respective frequency response characteristic and said energy from both of the half cycles of said combined plurality of channels to provide a digital filter output signal having an amplitude responsive to energy at frequencies passed by said filter,
   iv) said digital filter output signals including a first digital filter output signal from a first digital filter and a second digital filter output signal from a second digital filter;
c) a marker generator circuit responsive to the amplitude of said first digital filter output signal and the amplitude of said second digital filter output signal to generate a sequential plurality of markers indicating the relationships between different frequency energies of both of the half cycles of said combined plurality of channels.

22. The apparatus of claim 21 further including a marker associator circuit responsive to said high definition television program and said sequential plurality of markers and operative to associate said sequential plurality of markers with a video signal of said high definition television program in a fashion such that the marker will not be adversely affected by the subsequent processing of the video signal.

23. The apparatus of claim 21 further including a marker associator circuit responsive to said high definition television program and said sequential plurality of markers and operative to associate said sequential plurality of markers in the image portion of a video signal of said high definition television program in a fashion such that the marker will not be adversely affected by the subsequent processing of the video signal.

24. The apparatus of claim 21 further including a marker associator circuit responsive to said high definition television program and said sequential plurality of markers and operative to associate said sequential plurality of markers in a non-image area of the data stream carrying the video signal of said high definition television program in a fashion such that the marker will not be adversely affected by the subsequent processing of the video signal.

25. The marker generator circuit of claim 21 wherein said sequential plurality of markers is responsive to said first digital filter output signal being greater than a threshold and responsive to said second digital filter output signal being greater than a threshold.

26. The marker generator circuit of claim 21 including a digital comparator and said sequential plurality of markers is responsive to the amplitude of said first digital filter output signal exceeding a threshold.

27. The apparatus of claim 21 wherein said sequential plurality of markers represents the presence of particular features of the sound being carried by said digital audio portion of said high definition television program.

28. The apparatus of claim 21 wherein said marker generator circuit includes a digital comparator having an output which changes in response to particular features of the sound being carried by said digital audio portion of said high definition television program, said marker generator circuit further responsive to the video signal of said high definition television program and said output of said digital comparator to provide said sequential plurality of markers.

29. The apparatus of claim 21 wherein said marker generator circuit includes a digital comparator having an output which changes in response to said presence of particular features, said marker generator circuit further responsive to the video signal of said high definition television program and said output of said digital comparator to provide digital byte markers, each byte having eight bits, with a known number of markers per one or more video frames of said video signal.

* * * * *